United States Patent [19]

Chubey et al.

[11] Patent Number: 4,974,400
[45] Date of Patent: Dec. 4, 1990

[54] HYDRAULIC VALVE CONTROL LINKAGE

[75] Inventors: Adam J. Chubey, St. Pierre, Canada; Joseph C. Hurlburt, Lancaster, Pa.

[73] Assignee: Ford New Holland, Inc., New Holland, Pa.

[21] Appl. No.: 378,350

[22] Filed: Jul. 11, 1989

[51] Int. Cl.$^5$ .............................................. A01D 69/03
[52] U.S. Cl. .................................... 56/010.2; 56/10.8; 56/DIG. 15; 180/333
[58] Field of Search .................. 56/1, 10.2, 10.8, 11.9, 56/DIG. 9, DIG. 15; 74/878; 91/508; 180/306, 333, 338

[56] References Cited

U.S. PATENT DOCUMENTS

| | | |
|---|---|---|
| 3,135,234 | 6/1964 | Tweridge .............................. 74/878 |
| 3,611,827 | 10/1971 | Bottum ................................... 91/508 |
| 3,736,737 | 6/1973 | Schumacher, II et al. ... 56/DIG. 15 |
| 4,059,171 | 11/1977 | Pakosh ............................... 180/77 S |
| 4,612,757 | 9/1986 | Halls et al. ........................... 56/10.2 |
| 4,685,340 | 8/1987 | Shust et al. ............................. 74/11 |

*Primary Examiner*—Ramon S. Britts
*Assistant Examiner*—Terry Lee Melius
*Attorney, Agent, or Firm*—Larry W. Miller; Frank A. Seemar; Darrell F. Marquette

[57] ABSTRACT

A control linkage for use on a tractor to control hydraulic implements associated therewith is disclosed wherein a control lever controlling the raising and lowering of the header forming a part of an implement mounted on a tractor is provided with a control device detachably connected thereto and engageable with a second control lever operably controlling the speed of a hydraulic motor powering the components of the implement attached to the tractor. The control device automatically moves the control lever for the speed of the hydraulic motor to a slow position whenever the header lift control lever is moved to effect a raising of the header relative to the ground. The speed control lever is spring-loaded toward the fast position so that a return of the header lift control lever to lower the header into an operating position will result in an automatic return of the speed control lever to a fast position. The spring-loading mechanism includes a bayonet slot in a bracket in which an anchoring pin is movable such that a positioning of the anchoring pin in a hook portion of the bayonet slot anchors the mechanism for exerting a biasing force on the speed control lever, while a positioning of the anchoring pin into the slide portion of the bayonet slot will permit the pin to move with the speed control lever without anchoring the spring-loading mechanism.

15 Claims, 4 Drawing Sheets

HYDRAULIC VALVE CONTROL LINKAGE

BACKGROUND OF THE INVENTION

This invention relates generally to a control mechanism usable on tractors to control the operation of hydraulically powered mechanisms and, more particularly, to a control device operably interconnecting two separate hydraulic functions to effect the automatic movement of one function in response to the selective movement of the other function.

With the advent of a hydraulically powered articulated tractor such as marketed by Ford New Holland, Inc. as the Model 276 Bidirectional TM tractor, it has been desirable to provide implements mounted thereon to accomplish harvesting and other farming functions through use of the tractor. Hydraulically powered implements such as a mounted mower conditioner provide great flexibility in the use of the Bidirectional TM tractor. One of the limitations on the use of such implements is the hydraulic flow capacity of the tractor. In some situations, the hydraulic pump can be inadequate to provide the necessary flow of hydraulic fluid to satisfy the simultaneous need for steering the articulated tractor, driving the operable components of the implement, and powering the movement of a component or components of the implement, such as a crop harvesting header.

The hydraulic control valve for the hydraulic system on the Bidirectional TM tractor is provided with four spools, each of which is equipped with a flow control to limit the flow of hydraulic fluid through the spool. The spool associated with the steering of the tractor has full priority over the other spools and control thereof is independent. The mounting of an implement such as a mower conditioner on a tractor requires a satisfactory flow of hydraulic fluid to a hydraulic motor powering the operation of the harvesting components of the implement header. These two hydraulic mechanisms require a significant flow of hydraulic fluid such that very little remains for lifting the header relative to the ground, particularly when the hydraulic cylinder which is operably powering the header lift mechanism requires a greater pressure than is normally needed to power the rotation of the hydraulic motor operably driving the components of the implement.

Under such conditions, a manipulation of the control for the spool to activate the header lift cylinders has limited success because of the continued flow of hydraulic fluid to the hydraulic motor. Since operation of the components of the crop harvesting header is normally not needed when the header is being raised into a transport position above the ground, it would be desirable to provide a control linkage operable to reduce the flow of hydraulic fluid to the hydraulic motor whenever the hydraulic lift cylinders are actuated to effect a lifting of the header relative to the ground.

SUMMARY OF THE INVENTION

It is an object of this invention to overcome the aforementioned disadvantages of the prior art by providing a control device interconnecting a pair of independent hydraulic control levers to effect operation of one hydraulic control automatically in response to the activation of the other hydraulic control.

It is another object of this invention to reduce the flow of hydraulic fluid to one hydraulically powered mechanism automatically in response to the activation of a second hydraulically powered mechanism.

It is a feature of this invention that the control mechanism automatically controls the flow of the hydraulic fluid to independently operable hydraulically powered mechanisms so that an undersized hydraulic pump can provide adequate flow for powering various hydraulically powered mechanisms.

It is an advantage of this invention that the header lift mechanism on a mower conditioner mounted on a hydraulically powered tractor can be properly operated even though the hydraulic pump associated with therewith cannot provide sufficient capacity for simultaneously powering all of the hydraulically powered mechanisms on the mower conditioner.

It is another feature of this invention that the unneeded flow of hydrualic fluid to drive the operable components on the mower conditioner is restricted when the hydraulic header lift cylinders are actuated.

It is another advantage of this invention that the flow control lever for the flow of hydraulic fluid to the hydraulic motor can be spring-loaded to effect automatic return to a fast flow position upon the actuation of the control lever for the hydraulic header lift cylinders to lower the header to an operating position.

It is still another feature of this invention that the mechanism spring-loading the flow control lever toward the fast flow position can be selectivelY disengaged to permit a manual control of the flow control lever.

It is still another object of this invention to provide a mechanism for more efficiently controlling the operation of a hydraulic system on a tractor for powering the operation of an implement mounted thereto.

It is still another advantage of this invention that the control mechanism insures a desirable header lift rate without requiring a pump capacity equal to the combined steering, drive, and lift flows.

It is a further advantage of this invention that the control mechanism permits an enhanced operating performance of the implement and hydraulic system of the tractor by allowing a nominal full flow to power the header when the header is in an operating position adjacent the ground.

It is yet another object of this invention to provide a control linkage for the hydraulic system that is durable in construction, inexpensive of manufacture, carefree of maintenance, facile in assemblage, and simple and effective in use.

These and other objects, features, and advantages are accomplished according to the instant invention by providing a control linkage for use on a tractor to control hydraulic implements associated therewith wherein a control lever controlling the raising and lowering of the header forming a part of an implement mounted on a tractor is provided with a control device detachably connected thereto and engageable with a second control lever operably controlling the speed of a hydraulic motor powering the components of the implement attached to the tractor. The control device automatically moves the control lever for the speed of the hydraulic motor to a slow position whenever the header lift control lever is moved to effect a raising of the header relative to the ground. The speed control lever is spring-loaded toward the fast position so that a return of the header lift control lever to lower the header into an operating position will result in an automatic return of the speed control lever to a fast position. The spring-loading mechanism includes a bayonet slot in a bracket in which an anchoring pin is movable such that a positioning of the anchoring pin in a hook portion of the bayonet slot anchors the mechanism for exerting a biasing force on the speed control lever, while a positioning of the anchoring pin into the slide portion of the bayonet slot will permit the pin to move with the speed control lever without anchoring the spring-loading mechanism.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
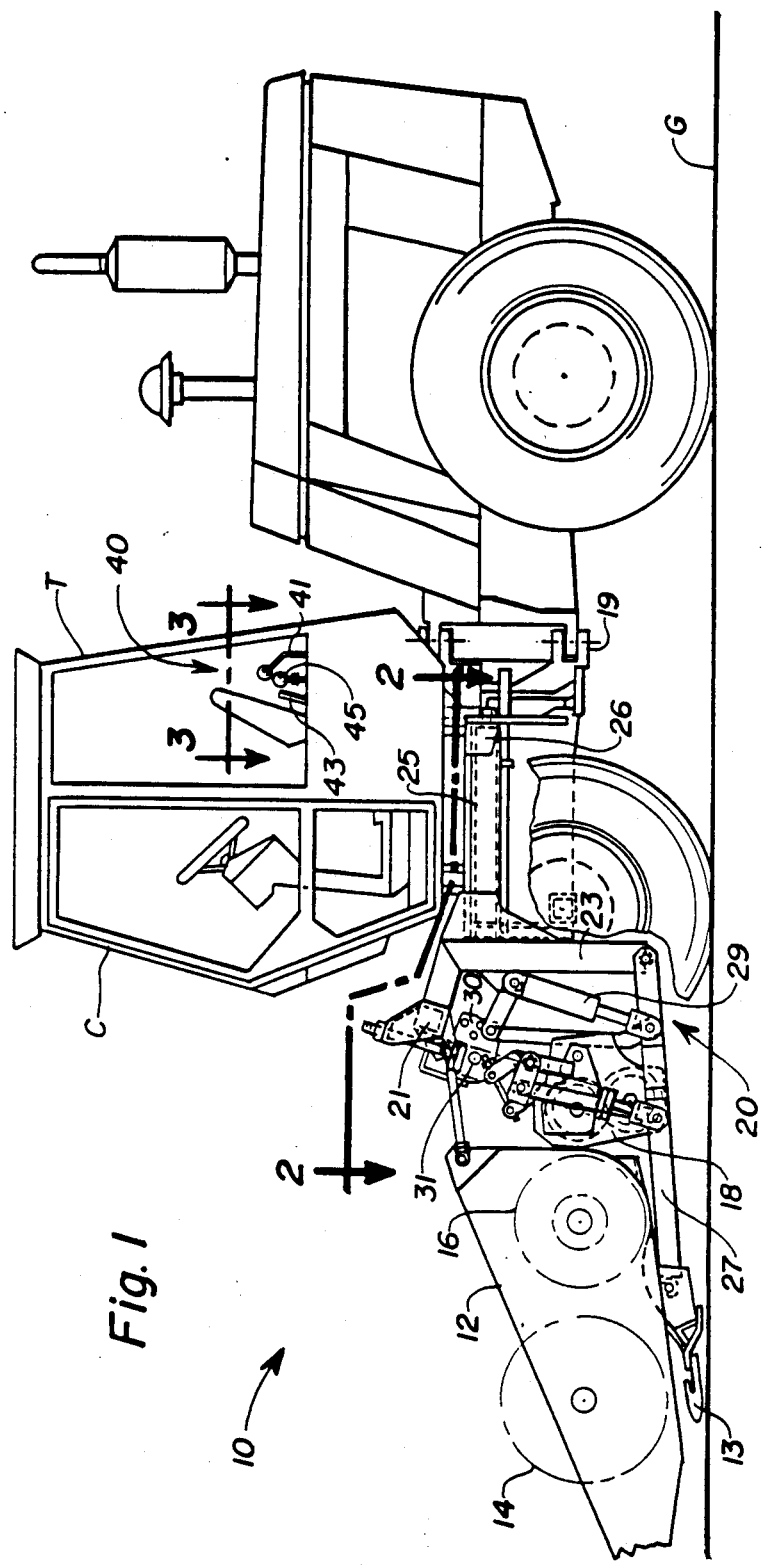
FIG. 1 is a side elevational view of a crop harvesting implement mounted on a hydraulically powered, articulated tractor incorporating the principles of the instant invention, portions of the tractor and portions of the crop gathering header of the implement being broken away for purposes of clarity.
Figure 2:
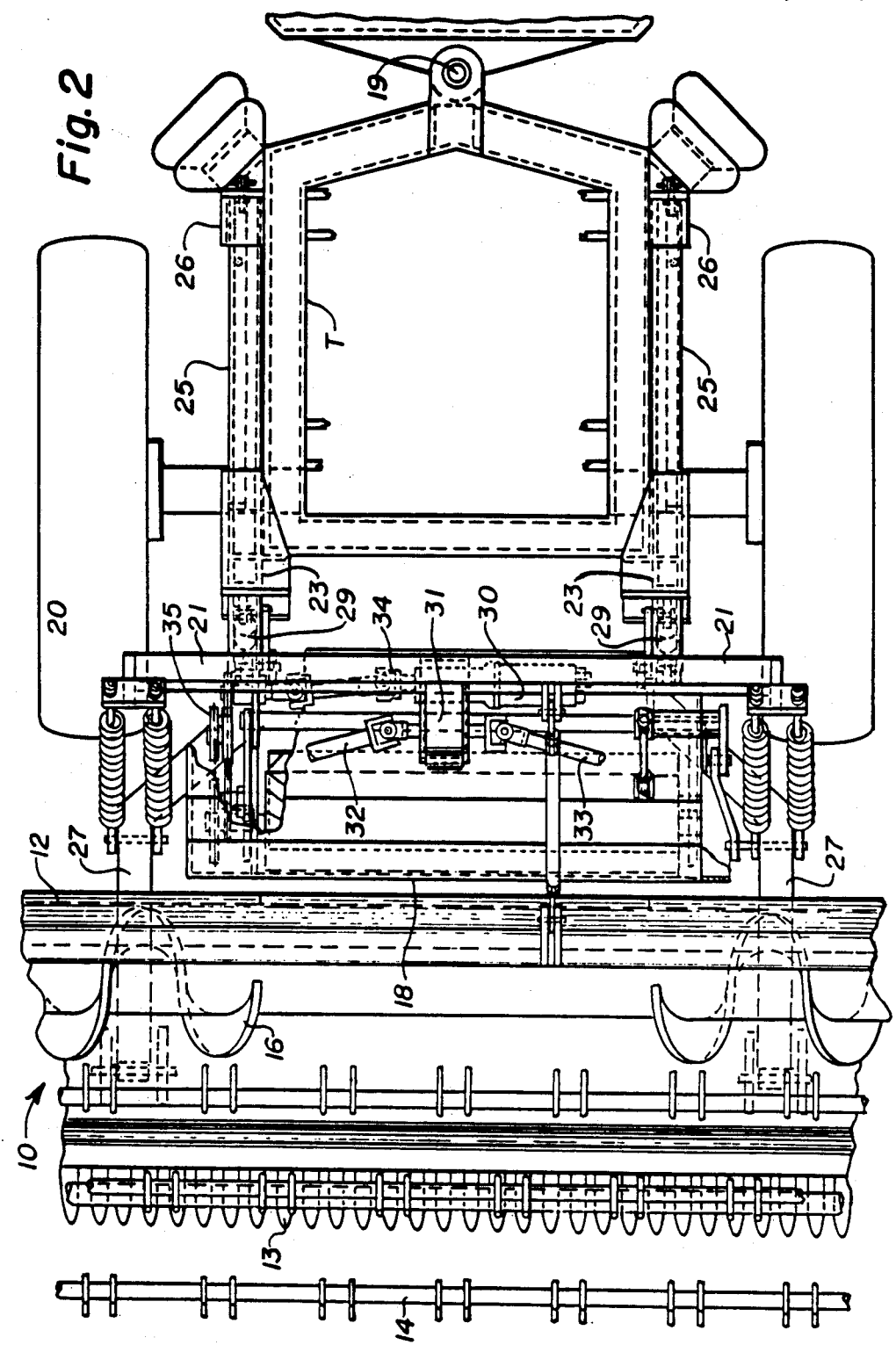
FIG. 2 is a cross-sectional view of the tractor taken along lines 2—2 of FIG. 1 to show a top plan view of the crop harvesting implement, major portions of the tractor and of the crop gathering header being broken away for purposes of clarity.

Referring now to the drawings and, particularly, to FIGS. 1 and 2, side elevational and top plan views of a crop harvesting machine, attached to a prime mover, such as a tractor, incorporating the principles of the instant invention, can best be seen. Any left and right references are used as a matter of convenience and are determined by standing at the rear of the tractor, facing the forward end, the direction of travel. Although the drawings depict the deployment of the crop harvesting machine to be mounted on the tractor, one skilled in the art will readily realize that the principles of the instant invention will be equally applicable to any hydraulically powered implement to be mounted on a tractor for operation in conjunction therewith.

The crop harvesting machine 10 is of the type to be mounted on the forward end of a tractor T to be pushed into the crop material to be harvested. The crop harvesting machine 10 includes a crop gathering header 12 which includes a conventional reciprocating cutterbar 13 to sever standing crop material from the ground G, a rotating reel 14 to convey the severed crop material over the cutterbar 13 and rearwardly therefrom in a conventional manner, and an auger 16 transversely extending along the rear of the crop gathering header 12 to receive severed crop material from reel 14, converge the crop material, and discharge it toward the rearwardly positioned conditioning mechanism 18. The crop gathering header 12 and conditioning mechanism 18 are mounted on an implement frame 20 adapted to be detachably affixed to the tractor T.

The tractor T is shown in the drawings as being the type of tractor described in greater detail in U.S. Pat. No. 4,059,171 and in U.S. Pat. No. 4,685,340, and marketed by Ford New Holland, Inc. as the Model 276 Bidirectional TM tractor. Although this tractor T is hydrostatically driven and steered through manipulation of the articulation joint 19, one skilled in the art will readily realize the principles of the instant invention are not limited by the type of tractor serving as the prime mover; however, the principles of the instant invention do relate to an implement mounted on the tractor T and requiring a plurality of hydraulically driven mechanisms for operation thereof, with the hydraulically driven mechanisms powered from a hydraulic system usually carried by the tractor T.

The implement frame 20 includes a main transverse beam 21 and a pair of transversely spaced, downwardly depending legs 23. A mounting arm 25 projects rearwardly (relative to the forwardly positioned header 12) from each downwardly depending leg 23. The tractor T carries attachment brackets 26 on opposing sides thereof positioned for engagement with the mounting arms 25 to detachablY connect the implement 10 to the tractor T. A pair of transversely spaced lift arms 27 are pivotally connected to respective downwardly depending legs 23 and extend forwardly therefrom for support of the header 12. The pivotal movement of the lift arms 27 relative to the legs 23 is controlled by a hydraulic cylinder 29 interconnecting each lift arm 27 and the corresponding leg 23 such that extension and retraction of the hydraulic cylinder 29 pivotally moves the lift arms 27 for generallY vertical movement of the header 12 mounted thereon.

The operable components of the crop gathering header 12, such as the reciprocating cutterbar 13, the reel 14, and auger 16, and the conditioning mechanism 18, are driven in a conventional manner by a hydraulically driven motor 30 providing rotational power thereto. The rotational output of the hydraulic motor 30 is received by a gearbox 31 and transferred to respective drive shafts 32, 33 to deliver rotational power to the respective outboard ends of the header 12 in a conventional manner and to the conditioning drive shaft 34 providing rotational power transferred to the conditioning mechanism 18 by the chain drive mechanism 35.

The hydraulic motor 30 and the hydraulic cylinders 29 are connected to a hydraulic system carried by the tractor T to provide a source of supply of hydraulic fluid under pressure to effect operation of both the hydraulic cylinders 29 and the hydraulically driven motor 15 for respective operation thereof. The hydraulic system is generally conventional and is described in greater detail in co-pending U.S. patent application entitled "Hydraulic Cylinder Mode Shift", filed on July 10, 1989, and assigned U.S. Pat. Ser. No. 377,662, issuing as U.S. Pat. No. 4,930,295 on June 5, 1990, the descriptive portions of which are incorporated herein by reference. The spools of the hydraulic valve are controlled by a control mechanism typically carried in the operator's cab C of the tractor T, as shown in FIGS. 1 and 3–6.

The control mechanism 40 includes a series of levers 41, 43, and 45 connected to respective spools of a conventional hydraulic valve to control the flow of hydraulic fluid to respective mechanisms as will be described in greater detail below. The first lever 41 operably controls the on and off function of the hydraulic motor 30 and is movable between a stop position and a go position for corresponding operation of the motor 30. The second control lever 43 is operably associated with the flow control for the flow of hydraulic fluid to the hydraulically driven motor 30 in a conventional manner. The flow control lever 43 is movable infinitely between a fast position and a slow position for controlling the amount of hydraulic fluid to the hydraulic motor 30, thereby controlling the speed of operation thereof. As one skilled in the art will readily realize, the movement of the flow control lever 43 to the slow position restricts the flow of hydraulic fluid to the motor 30.

Figure 3:
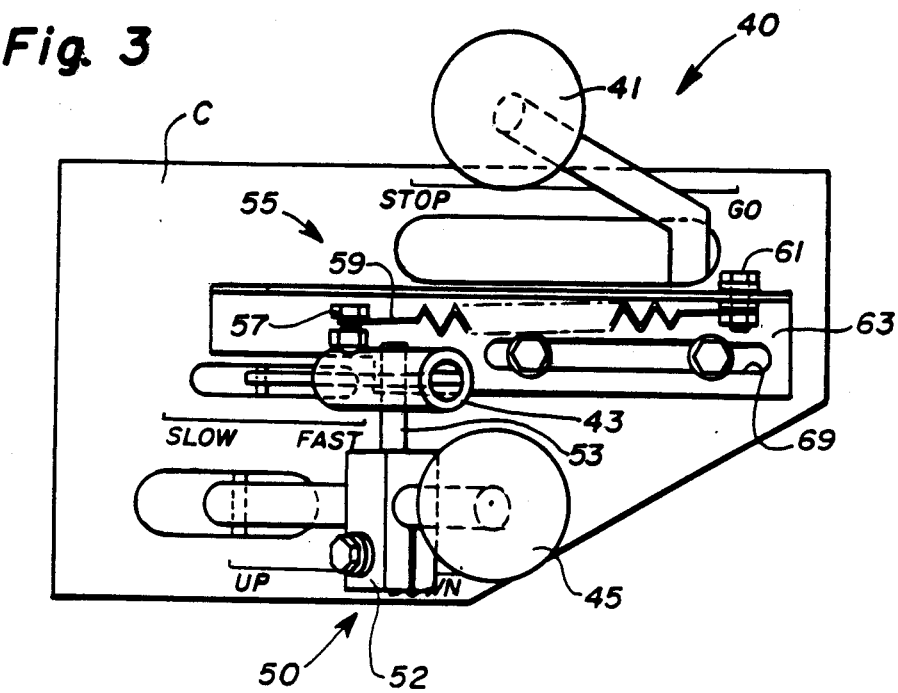
FIG. 3 is a top plan view of the control mechanism positioned in the cab of the tractor corresponding to lines 3—3 of FIG. 1, the control levers being set to permit a fast operation of the motor powering the crop harvesting implement with the header lowered in an operating position adjacent the ground, as shown in FIG. 1.
Figure 4:
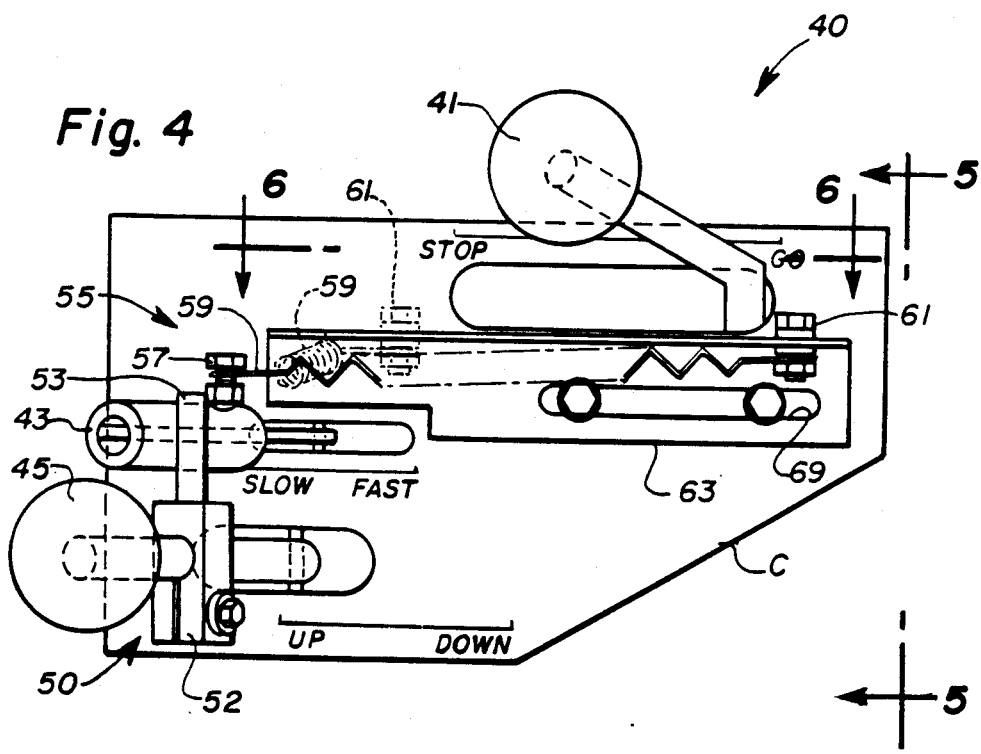
FIG. 4 is a top plan view of the control mechanism similar to that of FIG. 3 showing an actuation of the hydraulic lift control lever to raise the header into a transport position with a control device automatically manipulating the flow control for the hydraulic motor to restrict the flow of hydraulic fluid thereto, the movement of the anchoring pin in the slide portion of the bayonet slot being shown in phantom.

The third control lever 45 is operably associated with the respective hydraulic valve spool to control the extension and retraction of the hydraulic cylinders 29. In the configuration shown in FIG. 1, a powered retraction of the hydraulic cylinder 29 will cause a raising of the header 12 above the ground G, which corresponds to a movement of the third control lever 45 into the up position. A corresponding movement of the third control lever 45 to the down position as shown in FIGS. 3 and 4 releases pressure on the hydraulic cylinder 29 to permit gravity and the weight of the header 12 to effect an extension of the hydraulic cylinders 29. One skilled in the art will readily realize that a provision of the hydraulic cylinders 29 to be of the double acting version would result in a powering of the extension of the hydraulic cylinders 29 when the third control lever 45 is placed in the down position.

The hydraulic system of the tractor T provides priority to the hydraulic steering and the hydraulic driving of the tractor T. The remaining capacity of the tractor hydraulic system can be used to rotatably power the hydraulic motor 30 and to raise or lower the header 12 as described above. However, in some tractor configurations, the hydraulic pump does not have sufficient capacity to provide adequate hydraulic fluid flow simultaneously to the steering, drive, and lift mechanisms. Typically, however, a full operation of the crop gathering header 12 is not required when the header 12 is raised into the transport position by contraction of the hydraulic cylinders 29. Accordingly, the hydraulic flow to the motor 30 can be diverted to the hydraulic lift cylinders 29 to provide adequate operation thereof. Conversely, the flow of hydraulic fluid to the cylinders 29 is not required when the header 12 is in a lowered operating position when the motor 30 requires full operating power.

As best seen in FIGS. 3–6, the control mechanism 40 is provided with a control device 50 to effect a simultaneous movement of the flow control lever 43 from the fast position toward the slow position whenever the third control lever 45 is moved into the up position to effect a raising of the header 12. This control device 50 includes a hub 52 detachably connected to the third control lever 45 and an outwardly projecting rod 53 extending into engagement with the flow control lever 43 such that a movement of the third control lever 45 into the position will effect a simultaneous movement of the flow control lever 43 toward the slow position, thereby decreasing the flow of hydraulic fluid to the motor 30 for diversion to the hydraulic lift cylinders 29.

Figure 5:
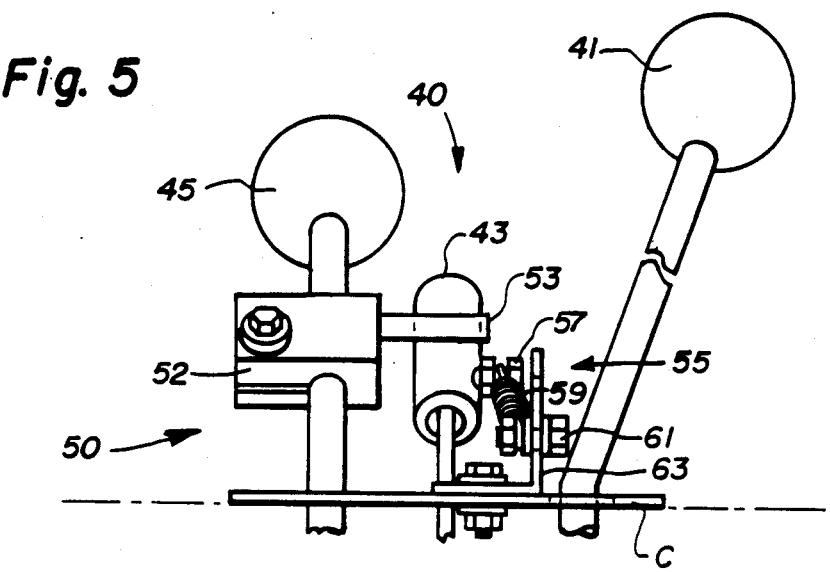
FIG. 5 is a partial cross-sectional view of the control mechanism corresponding to lines 5—5 of FIG. 4.
Figure 6:
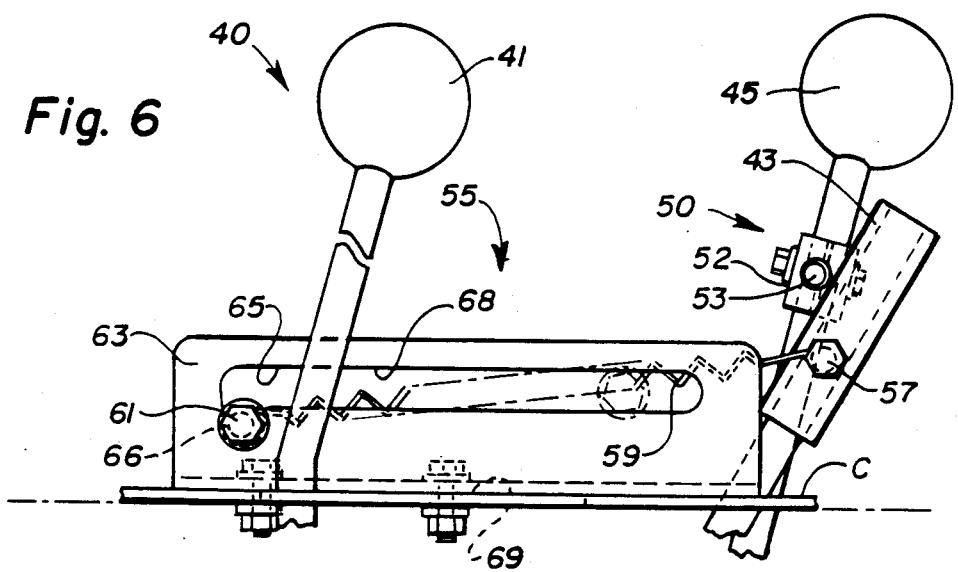
FIG. 6 is a partial cross-sectional view of the control mechanism corresponding to lines 6—6 of FIG. 4 to show the details of the spring-loading mechanism associated with the flow control lever, the movement of the anchoring pin in the slide portion of the bayonet slot being shown in phantom.

To return the flow control lever 43 to the fast position, the control mechanism 40 is also provided with a spring-loading mechanism 55 to exert a biasing force on the flow control lever 43 to urge the lever 43 toward the fast position. The spring-loading mechanism 55 includes a tab 57 connected to the flow control lever 43 to form a spring mount for the tension spring 59 connected at the opposing end thereof to an anchoring pin 61 engaged with a bracket 63. As best seen in FIGS. 5 and 6, the bracket 63 has a bayonet slot 65 including a hook portion 66 and a slide portion 68. The positioning of the anchoring pin 61 in the hook portion 66 of the bayonet slot 65 permits the anchoring pin 61 to serve as an anchor for the tension spring 59 to exert a biasing force on the flow control lever 43.

A repositioning of the anchoring pin 61 into the slide portion 68 of the bayonet slot 65 will allow the anchoring pin 61 to move with the flow control lever 43 between the fast and slow positions without causing a biasing force to be exerted thereon. AccordinglY, a positioning of the anchoring pin 61 in the slide portion 68 of the bayonet stop 65 requires a manual repositioning of the flow control lever 43 into the fast position when so desired. The bracket 63 is adjustably mounted with an adjustment slot 69 permitting movement of the bracket 63 fore-and-aft of the flow control lever 43 to permit an adjustment of the distance between the hook portion 66 and the control lever 43 when in the fast position, thereby varying the tension to be exerted by the tension spring 59.

Normal operation of the crop gathering header 12 is reflected in FIG. 3. The hydraulic motor 30 is being driven at maximum speed to provide rotational power to the operable components of the header 12, while the crop harvesting header 12 is lowered into the operating position shown in FIG. 1, with the third control lever 45 moved into the down position. When the operator desires to raise the header 12, a positioning of the third control lever 45 into the up position causes engagement of the rod 53 with the flow control lever 43 to cause a simultaneous movement of the flow control lever 43 toward the slow position. This movement of the control lever 43 permits the flow of hydraulic fluid to be diverted from the hydraulic motor 30 to the hydraulic lift cylinders 29 for proper operation thereof.

A return of the header 12 to the lowered operating position, effected by a return of the third control lever 45 to the down position as reflected in FIG. 3, permits the flow control lever 43 to be returned to the fast position by the biasing force urged thereon by the spring-loading mechanism 55. As a result, a repositioning of the header 12 into a lowered operating position permits the flow of hydraulic fluid to be diverted back from the hydraulic lift cylinders 29 to the hydraulic motor 30 for enhanced operation thereof allowing a full flow of hydraulic fluid thereto.

A disengagement of the spring-loading mechanism 55 is depicted in FIGS. 4–6. The simple movement of the anchoring pin 61 out of the hook portion 66, as shown in solid lines in FIG. 6, to permit the anchoring pin 61 to move along the slide portion 68 of the bayonet slot 65 will prevent the tension spring 59 from exerting any biasing force on the flow control lever 43. Whenever the anchoring pin 61 is slidable within the slide portion 68, a return of the header lift control lever 45 to the down position will not result in an automatic return of the flow control lever 43 to the fast position. In addition, the control device 50 can be completely dismantled by a removal of the hub 52 from the third control lever 45 for a rotation thereof to prevent engagement of the rod 53 with the flow control lever 43.

It will be understood that changes in the details, materials, steps, and arrangement of parts which have been described and illustrated to explain the nature of the invention may occur to and may be made by those skilled in the art upon a reading of this disclosure within the principles and scope of the invention. The foregoing description illustrates the preferred embodiment of the invention; however, concepts as based upon the description may be employed in other embodiments without departing from the scope of the invention. Accordingly, the following claims are intended to protect the invention broadly as well as in the specific form shown.

Having thus described the invention, what is claimed is:

1. In a vehicular apparatus having a harvesting implement associated therewith, said apparatus having a first hydraulically powered mechanism, a second independently operable hydraulically powered mechanism, and a hydraulic system operably connected to said first and second mechanisms to provide a source of hydraulic fluid under pressure thereto, said hydraulic system having a first control lever operably associated with the speed of operation of said first mechanism, and a second control lever operably associated with the function of said second mechanism and being movable between first and second positions corresponding to operable functions of said second mechanism, the improvement comprising:

a control device operably associated with said second control lever and being operably engageable with said first control lever such that a movement of said second control lever from said first position to said second position causes a movement of said first control lever to effect a change in the speed of operation of said first mechanism.

2. The apparatus of claim 1 wherein said first control lever is movable between a fast position corresponding to a fast speed of operation of said first mechanism and a slow position corresponding to a slow speed of operation of said first mechanism, the movement of said second control lever from said first position to said second position causing a movement of said first lever from said fast position toward said slow position to effect a decrease in the speed of operation of said first mechanism.

3. The apparatus of claim 2 wherein said first control lever is spring-loaded to urge movement thereof toward said fast position so that a return of said second control lever to said first position will result in a return of said first control lever to said fast position.

4. The apparatus of claim 3 wherein said first lever is connected to a spring anchored by an anchoring pin engaged with a bracket having a bayonet slot therein within which said anchoring pin is slidable, said bayonet slot having a hook portion which fixes the movement of said pin to provide an anchor for said spring so that said spring can exert a biasing force on said first control lever to urge said first control lever toward said fast position.

5. The apparatus of claim 4 wherein said bayonet slot also has a slide portion in which said anchoring pin is free to move when not positioned in said hook portion, the positioning of said anchoring pin in said slide position preventing said spring from having an anchor from which to develop said biasing force, thereby allowing said first control lever to remain in a position other than said fast position when said second control lever moves from said second position back to said first position.

6. The apparatus of claim 5 wherein said control device includes a hub detachably connected to said second control lever and a rod projecting outwardly from said hub into engagement with said first control lever.

7. The apparatus of claim 6 wherein said first mechanism is a hydraulic motor, said first control lever controlling the rate of flow of hydraulic fluid to said motor, thereby controlling the speed of operation of said motor, said second mechanism being a hydraulic cylinder controlling the raising and lowering of an implement driven by said motor, the movement of said second control lever to said second position effecting a raising of said implement during which a fast operational speed of said motor is not required for operation of said implement.

8. In a tractor having an implement connectable thereto, said implement having a hydraulic motor providing operational power thereto and a hydraulic cylinder providing movement of a member associated with said implement, said hydraulic motor being operable at varying speeds, said tractor having a control mechanism including a first lever controlling the speed of operation of said hydraulic motor and being movable between a slow and a fast position and a second lever controlling an extension and contraction of said hydraulic cylinder and being movable between a first and a second position, an improved control mechanism comprising:

a control device operably connected with said second lever and movable therewith between said first and second positions, said control device being engageable with said first lever such that a movement of said second lever from said first position to said second position causes a corresponding movement of said first lever from said fast position toward said slow position to effect a reduction in the speed of said hydraulic motor when said hydraulic cylinder is actuated by the movement of said second lever from said first position to said second position.

9. The tractor of claim 8 wherein said hydraulic motor and said hydraulic cylinder are powered from a hydraulic system carried by said tractor.

10. The tractor of claim 9 wherein said first lever is spring-loaded for movement toward said fast position so that a return of said second lever to said first position will result in a movement of said first lever to said fast position.

11. The tractor of claim 10 wherein said control mechanism further comprises a bracket having a bayonet slot therein including a hook portion and a slide portion and carrying an anchoring pin which can be anchored in said hook portion or is freely movable in said slide portion, said first lever having a spring interconnecting said first lever and said anchoring pin to provide a biasing force on said first lever when said anchoring pin is positioned in said hook portion.

12. The tractor of claim 11 wherein the placement of said anchoring pin in said slide portion of said bayonet slot permits said anchoring pin to move with said first lever without causing a biasing force to be exerted thereon.

13. The tractor of claim 12 wherein said control device includes a detachable hub connected to said second lever and a rod extending outwardly from said hub for engagement with said first lever.

14. The tractor of claim 13 wherein said control mechanism further includes a third lever controlling the on/off function of said hydraulic motor.

15. The tractor of claim 13 wherein said second lever controls the movement of lift arms on said implement to which a crop harvesting header is mounted and operably driven by said hydraulic motor, the movement of said second lever into said second position effecting a raising of said crop harvesting header, the corresponding slowing of the operation of said motor due to the movement of said first lever toward said slow position permitting a diversion of the flow of hydraulic fluid from said hydraulic motor to said hydraulic cylinder.

* * * * *